United States Patent [19]

Pomper et al.

[11] 3,836,714

[45] Sept. 17, 1974

[54] DIGITAL VOICE DETECTOR

[75] Inventors: William J. Pomper; Charles G. Wilhelm; Leonard M. Yancey, all of San Diego, Calif.

[73] Assignee: The United States of America as represented by the Secretary of the Navy, Washington, D.C.

[22] Filed: Aug. 24, 1973

[21] Appl. No.: 391,186

[52] U.S. Cl. .............................. 179/1 SC, 328/119

[51] Int. Cl. ............................................ G10l 1/04

[58] Field of Search... 179/1 SA, 1 VC, 1 D, 15 AS, 179/100.1 VC, 2 DP; 340/146.1 AQ, 347 P, 146.1 E; 328/119, 63

[56] References Cited

UNITED STATES PATENTS 3,566,280 2/1971 Emmons et al. ..................... 328/63

3,760,354 9/1973 Ginn ........................... 340/146.1 E

*Primary Examiner*—Kathleen H. Claffy

*Assistant Examiner*—Tommy P. Chin

*Attorney, Agent, or Firm*—R. S. Sciascia; G. J. Rubens

[57] ABSTRACT

Digital apparatus for detecting the presence of voice in a vocoder output signal to produce a push-to-talk (PTT) signal for simplex operation of communication apparatus. When voice is detected by shift register and logic detection apparatus, a signal is generated that sets a hold circuit which supplies a PTT output for generation of an isolated key signal. The hold circuit is reset each time that voice is detected in the vocoder signal; therefore, PTT is maintained until there are no voice signals present during a complete hold period which is switch-selectable. A sampling signal for voice detection and a synchronization signal are supplied to the voice detection circuit by interface circuitry.

5 Claims, 3 Drawing Figures

PATENTED SEP 17 1974

3,836,714

SHEET 1 OF 2

DIGITAL VOICE DETECTOR

BACKGROUND OF THE INVENTION

State-of-the-art voice detectors (VOX) generally comprise either manually operated PTT signal devices or analog apparatus in which incoming audio signals are first amplified and then rectified to develop a D-C bias voltage. The bias voltage is used to trigger a threshold device. A major disadvantage of such devices, however, is that they do not have the capability for insuring that only the signal intended is the actual one desired to initiate a PTT. That is, the apparatus does not insure that voice is present before a push-to-talk signal is generated. As a consequence, premature keying of the transmitter can result. The aforementioned disadvantage is especially critical with respect to satellite communication systems; hence the present invention discloses apparatus for utilizing in a maximum manner such sophisticated and highly expensive communication systems by disclosing novel digital voice detector apparatus which insures that voice is present before a PTT signal is developed to key the transmitter of a satellite communication system.

SUMMARY OF THE INVENTION

Apparatus for digitally detecting the presence of voice from the output of a vocoder interface device in a communication system. The apparatus comprises a voice detection circuit and a push-to-talk (PTT) responsive hold circuit. The detection circuit includes shift register apparatus and voice detection logic. In operation, clear text vocoder data is clocked into the shift register apparatus by a received clock, and it is simultaneously fed to an interface vocoder. The data in the shift register is sampled for the presence of "voice" only once during each vocoder frame. The shift register contents are "read" by a frame sample signal which occurs at the same time in each vocoder frame. Voice is detected by observing presence of data in the vocoder word, i.e., a voiced signal (energy in the pitch channel) and a moderate amplitude level at mid-range (spectrum channels). The detection circuit then produces a PTT signal which is applied to a hold circuit which maintains the output for a given period after voice is detected. The hold circuit is reset each time voice is detected in the incoming vocoder word; therefore the PTT output is maintained until no voice is detected during a complete hold period. The PTT is then fed to output apparatus when energy is detected in any of the spectrum channel bits at the same time that energy is present in any of pitch channel bits.

OBJECTS OF THE INVENTION

It is the primary object of the present invention to provide apparatus compatible with digital communication systems to provide digital voice detection capabilities thereto.

It is another object of the present invention to provide digital voice detector apparatus which can insure operationally that voice is present in incoming data before a push-to-talk signal is developed in a communication system to thereby prevent premature keying of a transmitter.

It is a further object of the present invention to provide a voice detector which can detect digitalized voice.

Other objects, advantages and novel features of the invention will become apparent from the following detailed description of the invention when considered in conjunction with the accompanying drawings.

DESCRIPTION OF THE PREFERRED EMBODIMENT

Figure 1A:
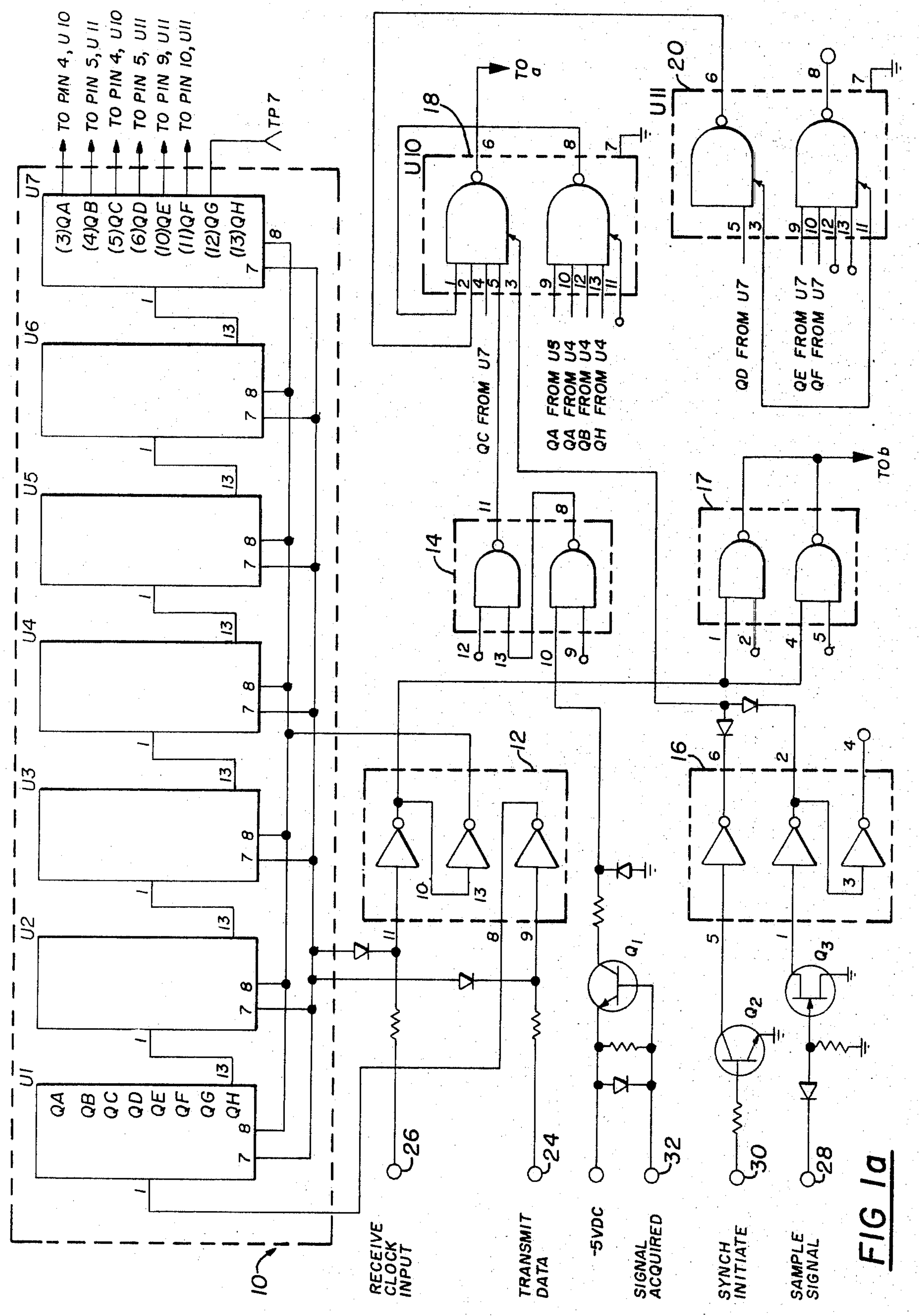
FIGS. 1*a* and 1*b* are a simplified electrical schematic of the novel digital voice detection apparatus comprising the present invention; and, FIG. 2 is a tabular illustration of the contents of the shift register circuitry of FIG. 1 at the time of sampling.
Figures 1B, 2:
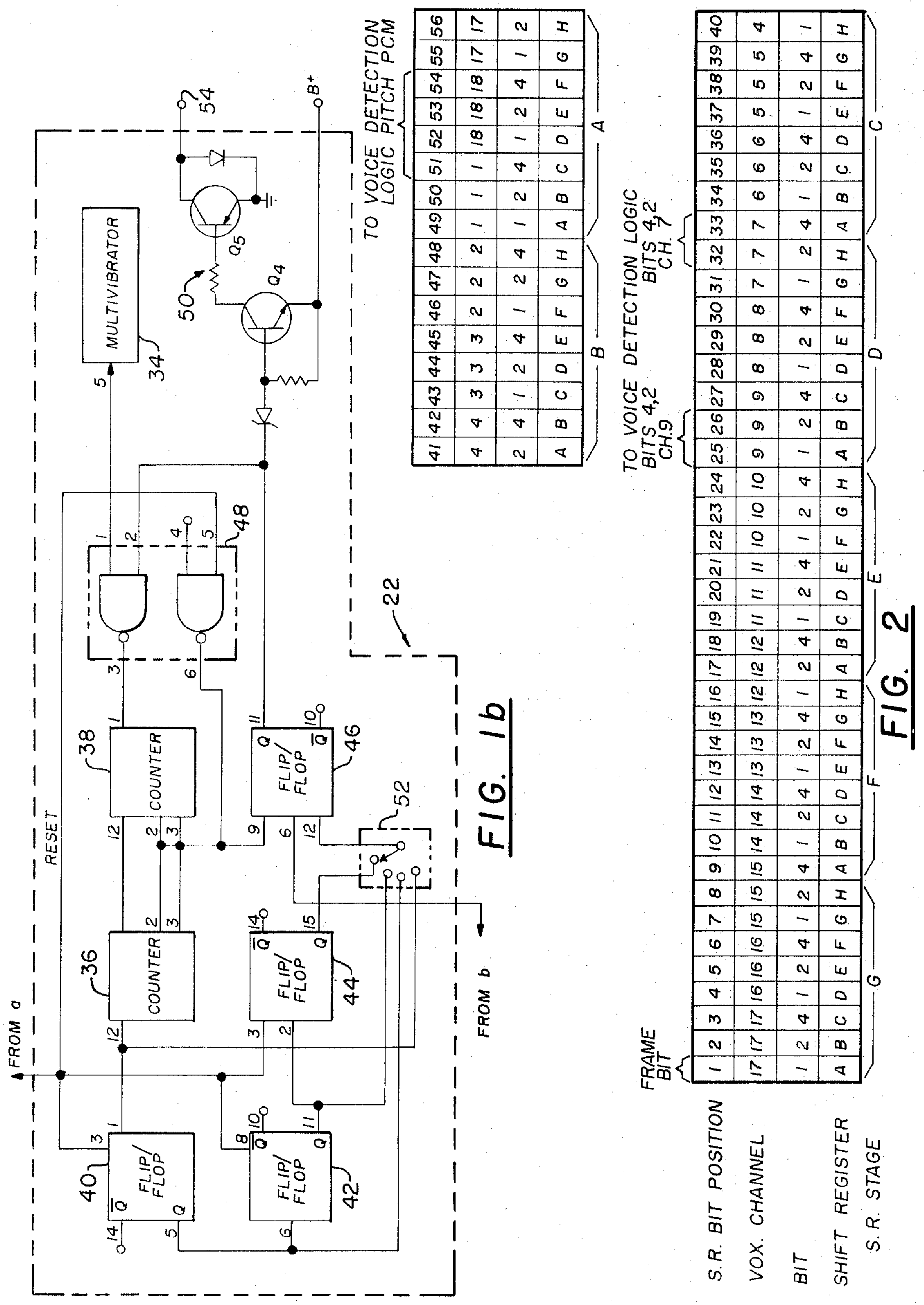

As stated previously, the voice detector apparatus (VOX) of FIGS. 1*a* and 1*b* detect the presence of voice in an incoming signal which has been converted from analog to digital by an interface vocoder circuit (not shown). The detector produces in response to the incoming signal a push-to-talk (PTT) signal in substantially the following manner.

When voice is detected by the circuit of FIGS. 1*a* and 1*b*, a signal is generated that "sets" the hold circuit 22 of the apparatus. The hold circuit supplies a PTT output to an interface unit (not shown) which then provides an isolated key signal to a communications transmitter, as in a satellite. The hold circuit is reset each time that voice is detected in the vocoder word. Therefore PTT is maintained until there are no voice signals present during a complete hold period.

The "hold" period is switch selectable between, for example, 1, 2, 4, and 8 seconds, and the sampling signal which is needed for voice detection and a system synchronization signal are applied to the voice detection circuit from an external unit (not shown).

The voice detection circuit to be described herein was developed primarily to be used with naval communication systems and apparatus commonly known as AUTOSEVOCOM, STEAMVALVE, and TACSATCOM. TACSATCOM comprises a UHF terminal, AUTOSEVOCOM comprises a narrow band, secure voice telephone network, and STEAMVALVE comprises a narrow-band secure voice system. The preferred embodiment will be described in detail with reference to the aforementioned communication systems which are well-known to those skilled in the art; however, it should be understood and appreciated that the scope of the invention is not limited by the operational characteristics of those systems. Rather, the novel concept which is disclosed comprises the broad use of a digital voice detector which can be used in a variety of communication systems for a multiple number of purposes.

The apparatus of FIGS. 1*a* and 1*b* essentially comprises a voice detection circuit and a PTT hold circuit 22. The voice detection circuit includes a 56-stage shift register 10 and associated voice detection logic, 18 (U10) and 20 (U11). In operation, clear text vocoder data applied at the terminal 24 (e.g., from an incoming AUTOSEVOCOM line) is clocked into the shift register 10 by the receive clock input which is applied at the terminal 26. The vocoder data is fed through the inverter 12. This received data is also fed to the interface vocoder unit (not shown).

The data in the shift register 10 is sampled for the presence of voice only once during each vocoder frame. The shift register contents are then "read" in response to the frame sample signal developed externally and applied to the terminal 28. The sample signal is connected to the detection logic circuit 18 and 20 (NAND-gates) through the inverter 16 and through the diode CR7. Since the frame sample signal synchronizes with the incoming data, it occurs at the same time in each vocoder frame.

As stated above, voice is detected by observing the presence of data in the vocoder word which indicates that a voiced signal (energy in the pitch channel) is present simultaneously with a moderate amplitude level at mid-range (spectrum channel).

FIG. 2 illustrates in tabular form the contents of the shift register circuitry 10 at the time of sampling. Bits 2 and 4 of spectrum channel 7; bits 1 and 2 of spectrum channel 9; and bit 4 of the pitch channel, are fed to the detection logic circuit NAND-gate 18. Bits 1, 2, and 4 of the pitch channel are fed to the detection logic circuit NAND-gate 20. To facilitate the understanding of the above, the following table is presented.

| SPECTRUM | BIT | PITCH CHANNEL | SHIFT REG. Q | DETECTION LOGIC |
| --- | --- | --- | --- | --- |
| CHANNEL | NUMBER | BIT | FROM | TO |
| No. 7 | 2 | | QH U4-13 | U10-13 |
| No. 7 | 4 | | QA U5-3 | U10-9 |
| | | | QA U4-3 | U10-10 |
| No. 9 | 1 | | QB U4-4 | U10-12 |
| No. 9 | 2 | | | |
| | | 4 | QC U7-5 | U10-4 |
| | | 1 | QD U7-6 | U11-5 |
| | | 2 | QE U7-10 | U11-9 |
| | | 4 | QF U7-11 | U11-10 |

The detection circuit causes the application of a PTT to an output circuit (not shown) via the hold circuit 22 when energy (a logic "1") is detected in any of the spectrum channel bits at the same time that energy (a logic "1") is present in any of the pitch channel bits. A PTT output will thus occur only when bit 4 of the pitch information is a logic "0". This assures that a PTT will not be applied when all "1"'s are being received.

The PTT output is inhibited when the interface vocoder is not synchronized by a synch initiate signal applied to the terminal 30 and through Q2 and the inverter 16 to the detection logic circuit NAND-gate. The PTT output is also inhibited when the output circuit has a receive "signal acquired" signal present at the input terminal 32, which signal is fed to 18.

The hold circuit 22 maintains the PTT output for a given period after voice is detected, and it is reset each time voice is detected in the incoming vocoder word. Therefore, the PTT output is maintained until no voice is detected during a complete hold period. As stated above, the output is also inhibited when a signal acquired indication is received externally. This prevents the system from being keyed inadvertently while in the receive mode.

The hold circuit 22 comprises an astable multivibrator 34 which feeds a pair of decade counters 36 and 38. The counters are followed by a series of divide-by-two flip-flops 40, 42, 44, and 46. The outputs of the flip-flops are connected through an inverter 48 into a driver circuit 50. The "hold" period (delay time) is switch selectable by means of the switch device 52.

When voice is detected by the voice detection logic circuit 18 and 20, a reset pulse is developed therein to reset the flip-flops and the decade counters. Upon receipt of the reset pulse, the "Q" output of the flip-flop 40 becomes a logic "1," thereby enabling the NAND-gate 48 and energizing the driver circuit 50. The PTT is derived at the output terminal 54 of the driver circuit.

The "Q" output of the flip-flop 40 remains a logic "1" since the flip-flop and counters in the hold circuit are reset each time that voice is detected. When the "reset" pulse is no longer present due to the absence of voice, the delay signal "sets" the flip-flop 40, thereby disabling the PTT and the 50Hz signal from the multivibrator 34. As stated, the delay signal is switch selectable.

The voice detection circuit can be implemented with various types of integrated circuits. For example, an 8-bit shift register; expandable dual 4-input NAND-gates; quadruple 2-input NAND-gates; and inverters can be used. The 8-bit shift register can comprise a serial-to-parallel converter. The gated serial inputs (A and B) control incoming data as a low at either (or both) inputs, inhibit entry of new data, and reset the first flip-flop to the low-level at the next clock pulse. A high-level input enables the other input which then determines the state of the first flip-flop. Data at the serial inputs may be changed while the clock is high, but only information meeting the setup requirements will be entered. Clocking occurs on a low-to-high transition of the clock input.

The expandable dual 4-input NAND-gates comprise well-known integrated circuit devices whose element logic and signal pin connections and associated input-/output truth tables are well-known to those skilled in the art.

Likewise, the quadruple 2-input NAND-gate comprises an integrated circuit which is well-known to those skilled in the art. If one of the inputs is not connected, the effect is the same as a continuous logic "1" because of the lack of input current; grounded input is the same as a logic "0" in an operational sense. When both gate inputs are logic "1," the output is a logic "0."

A common application of the circuit is to apply a digital signal to one input and a control signal to the other. If the control signal is a "0", the digital signal is inhibited as the circuit output is a continuous logic "1". When the control signal is a logic "1", the logic "1" bits of the digital signal cause the output to be a logic "0," and the logic bits cause the output to be a logic "1." In this instance the gate is enabled, passing the digital signal from input to output in inverted form. If one of the inputs is not connected, the circuit functions as an inverter only.

Thus it can be seen that novel voice detection apparatus has been disclosed. Obviously many modifications and variations of the present invention are possible in the light of the above teachings. It is therefore to be understood that within the scope of the appended claims the invention may be practiced otherwise than as specifically described.

What is claimed is:

1. Digital voice detection apparatus comprising:

first input means for receiving incoming clear text vocoder data and receive clock signals;

data storage means for accepting said vocoder data in response to said clock signals;

sampling means connected to the output of said data storage means and comprising pitch and spectrum channels;

second input terminal means for receiving sample signals in synchronism with said vocoder data and being connected to said sampling means whereby the accepted data in said data storage means is sampled by said sampling means in response thereto;

said sampling means being responsive to said sampled data to produce a pulse output indicating the presence of voice only when selectively predetermined binary numbers corresponding to energy are detected in said pitch and spectrum channels simultaneously.

2. The apparatus of claim 1 further including delay circuit means connected to the output of said sampling means for maintaining said pulse output a selectively predetermined time period.

3. The apparatus of claim 1 wherein said data storage means comprises a multi-stage shift register.

4. The apparatus of claim 3 wherein said sampling means comprises a pair of serially connected NAND-gates.

5. The apparatus of claim 2 wherein said delay circuit means comprise a multivibrator connected at its output to a pair of decade counters which feed a flip-flop circuit.

* * * * *